United States Patent
Harada et al.

[11] 3,846,032
[45] Nov. 5, 1974

[54] BALL JOINT DEVICE

[75] Inventors: Isao Harada, Hekinan; Fumitaka Ryuka, Nishio, both of Japan

[73] Assignee: Hojitsu Kogyo Co., Ltd., Nishio-shi, Japan

[22] Filed: June 8, 1973

[21] Appl. No.: 368,459

[30] Foreign Application Priority Data
June 17, 1972   Japan................ 47-72028
June 17, 1972   Japan................ 47-72029

[52] U.S. Cl. ............................................. 403/140
[51] Int. Cl. ............................................. F16c 11/06
[58] Field of Search ............ 403/135, 140, 133, 122

[56] References Cited
UNITED STATES PATENTS

| | | | |
|---|---|---|---|
| 3,226,142 | 12/1965 | Herbenar | 403/135 |
| 3,309,117 | 3/1967 | Gottschald | 403/135 |
| 3,574,368 | 4/1971 | Songer | 403/135 X |

*Primary Examiner*—Geo. V. Larkin
*Attorney, Agent, or Firm*—Karl W. Flocks

[57] ABSTRACT

A ball joint device in which a ball joint seat having a planar or corrugated flange portion or a flange portion formed with an annular projection is firmly held under compression at the flange portion thereof between mating flange portions of a cap and a housing so that the seat can be locked against rotation and desired gas-tightness can be ensured at the mating surfaces of the flange portions of the cap and housing.

4 Claims, 5 Drawing Figures

PATENTED NOV 5 1974　　3,846,032

BALL JOINT DEVICE

BACKGROUND OF THE INVENTION

This invention relates to a ball joint device for use in suspensions, steering gears, link ends and the like of automotive vehicles or for use as a universal connection means for links in industrial machines. More particularly, the present invention relates to a device for mounting a ball joint seat in a ball joint so as to lock the ball joint seat against rotation and ensure desired gas-tightness at the seat portion.

Prior art ball joint devices having a conventional ball joint seat have been defective in that the ball joint seat cannot be satisfactorily locked against rotation or the desired locking effect cannot be obtained even with provision of locking means, and the devices are complex in construction, require troublesome steps for assembling and are costly.

SUMMARY OF THE INVENTION

With a view to obviate the above defects, it is a primary object of the present invention to provide a novel and improved ball joint device including a substantially semispherical hollow molded ball joint seat of synthetic resin material which is provided with a flange portion extending radially outwardly from the outer periphery of a lower end opening thereof and which is firmly held under compression at the flange portion thereof between mating flange portions of a housing and a cap so that the ball joint seat can be locked against rotation and desired gas-tightness can be ensured at the mating surfaces of the flange portions of the housing and cap.

DESCRIPTION OF THE PREFERRED EMBODIMENTS

Figure 1:
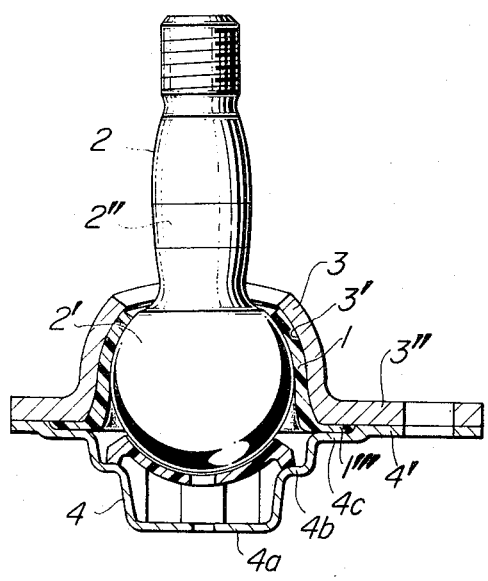
FIG. 1 is a longitudinal section of a ball joint device embodying the present invention.
Figure 2:
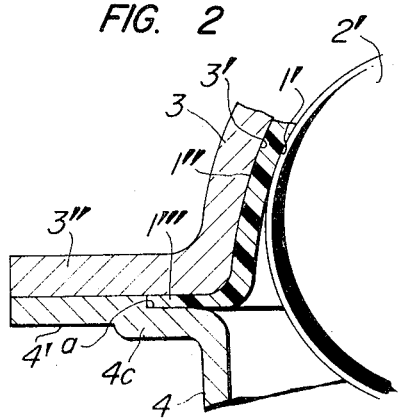
FIG. 2 is an enlarged section of parts of the device shown in FIG. 1.
Figure 3:
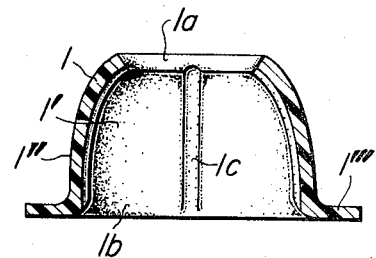
FIG. 3 is a section of the ball joint seat in the device shown in FIG. 1.
Figure 4:
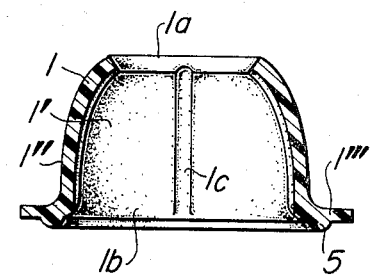
FIGS. 4 and 5 are sections of modifications of the ball joint seat shown in FIG. 3.
Figure 5:
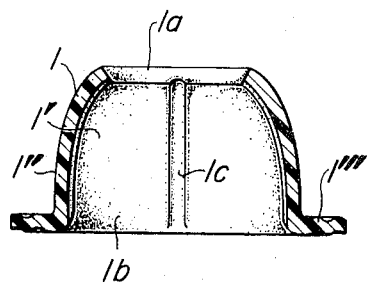

Referring now to FIGS. 1, 2 and 3, a substantially semispherical hollow ball joint seat 1 molded from a synthetic resin material has a spherical inner surface 1' surrounding a part of the ball-shaped head portion 2' of a ball-headed stud 2. The outer surface 1'' of the ball joint seat 1 has the same contour as that of the inner surface 3' of a flanged housing 3 to be in intimate contact with such surface. The ball joint seat 1 is provided with an upper end opening 1a so that the stem portion 2'' of the ball-headed stud 2 can project therethrough. The ball joint seat 1 is further provided with a lower end opening 1b so as to receive the ball-shaped head portion 2' of the ball-headed stud 2. A planar or flat flange portion 1''' extends radially outwardly from the outer periphery of the lower end opening 1b of the ball joint seat 1, as best shown in FIG. 3. In a modification shown in FIG. 4, at least one annular projection extends downward from the lower surface or upward from the upper surface of the flange portion 1''' of the ball joint seat 1. In another modification shown in FIG. 5, the flange portion 1''' of the ball joint seat 1 is suitably corrugated as shown.

A plurality of grooves 1c for lubrication with a lubricant such as grease may be formed on the spherical inner surface 1' of the ball joint seat 1 as required so as to reduce friction between the spherical inner surface 1' of the ball joint seat 1 and the spherical surface of the ball-shaped head portion 2' of the ball-headed stud 2 thereby minimizing undesirable wear of these two spherical surfaces. A cap 4 having a bottom portion 4a, a stepped intermediate portion 4b and a stepped rim portion 4c terminating in a flange portion 4' is secured to the housing 3 while holding the flange portion 1''' of the ball joint seat 1 between the stepped rim portion 4c of the cap 4 and the flange portion 3'' of the housing 3 as seen in FIG. 1. The device is so constructed that, when the flange portion 3'' of the housing 3 is superposed on the flange portion 4' of the cap 4, the space (a) defined between the flange portion 3'' of the housing 3 and the stepped rim portion 4c of the cap 4 is slightly less than the thickness of the flange portion 1''' of the ball joint seat 1. Thus, when the ball joint seat 1 having such a shape is fitted to engage the inner surface 3' of the housing 3 and the cap 4 is secured to the housing 3, the flange portion 1''' of the ball joint seat 1 is firmly held under compression between the flange portion 3'' of the housing 3 and the stepped rim portion 4c of the cap 4 to ensure desired gas-tightness at the mating surfaces of the flange portions 3'' and 4'.

It will be understood from the foregoing description that the ball joint seat 1 in the device according to the present invention is provided with the flange portion 1''' extending radially outwardly from the outer periphery of the lower end opening 1b thereof and this flange portion 1''' is firmly held under compression between the stepped rim portion 4c of the cap 4 and the flange portion 3'' of the housing 3. Thus, the present invention is advantageous over prior art devices including various seat locking means in that the device can be simply assembled at low costs and the ball joint seat can be reliably locked against rotation. Further, difficulty of attaining intimate contact between the flange portion 3'' of the housing 3 and the flange portion 4' of the cap 4 due to the provision of the flange portion 1''' on the ball joint seat 1 can be obviated by the provision of the stepped rim portion 4c in the cap 4, and thus the intimate engagement between these flange portions 3'' and 4' can be completely ensured.

When the ball joint seat 1 having the annular projection 5 formed integrally with the flange portion 1''' thereof or the ball joint seat 1 having the corrugated flange portion 1''' is incorporated in the ball joint device, the annular projection 5 or the corrugated flange portion 1''' is flattened between the flange portion 3'' of the housing 3 and the stepped rim portion 4c of the cap 4, thereby further improving the intimate engagement between the flange portions 3'' and 4', reliably locking the ball joint seat 1 against rotation and completely sealing the joint portion against leakage.

According to the present invention, therefore, the two requirements, that is, the requirement for reliably locking the ball joint seat 1 against rotation and the requirement for attaining desired gas-tightness at the joint portion can be completely satisfied, the manufacturing cost of the ball joint can be reduced, and the performance of the ball joint can be remarkably improved.

What is claimed is:

1. A ball joint device comprising a substantially semi-spherical hollow ball joint seat (1) having a flange portion (1''') extending radially outwardly from the outer periphery of a lower end opening (1b) thereof, a ball-headed stud (2) received at its ball-shaped head portion (2') in said ball joint seat (1), a housing (3) having a flange portion (3''), and a cap (4) having a stepped rim portion (4c) terminating in a flange portion (4'), said stepped rim portion (4c) being disposed adjacent to said flange portion (3'') of said housing (3) to define a space (a) therebetween, said space (a) being of slightly less thickness than that of flange portion (1''') of said ball joint seat (1), said ball joint seat (1) being disposed between said housing (3) and said cap (4) in such a manner that said flange portion (1''') thereof is received and firmly held under compression within said space (a) between said flange portion (3'') of said housing (3) and said stepped rim portion (4c) of said cap (4) thereby ensuring intimate gas-tight engagement between said flange portion (3'') of said housing (3) and said flange portion (4') of said cap (4), and means for holding said housing (3) and said cap (4) together in compression.

2. A ball joint device as claimed in claim 1, wherein said radially outwardly extending flange portion (1''') of said ball joint seat (1) is flat in shape.

3. A ball joint device as claimed in claim 1, wherein at least one annular projection (5) is formed integrally with said radially outwardly extending flange portion (1''') of said ball joint seat (1).

4. A ball joint device as claimed in claim 1, wherein said radially outwardly extending flange portion (1''') of said ball joint seat (1) is corrugated in shape.

* * * * *